United States Patent

Villaloboz

[11] 4,061,376
[45] Dec. 6, 1977

[54] ROCK BIT BEARING STRUCTURE

[75] Inventor: Arthur A. Villaloboz, Huntington Beach, Calif.

[73] Assignee: Smith International Inc., Irvine, Calif.

[21] Appl. No.: 768,944

[22] Filed: Feb. 15, 1977

Related U.S. Application Data

[63] Continuation of Ser. No. 695,906, June 14, 1976, abandoned.

[51] Int. Cl.² ............................................. F16C 19/06
[52] U.S. Cl. .................................... 308/8.2; 308/239
[58] Field of Search ................ 308/8.2, 237 R, 239, 308/241

[56] References Cited

U.S. PATENT DOCUMENTS

| 3,746,405 | 7/1973 | Welton | 308/8.2 |
| 3,765,495 | 10/1973 | Murdoch | 308/8.2 X |
| 3,866,695 | 2/1975 | Jackson | 308/8.2 X |

Primary Examiner—Robert R. Song
Assistant Examiner—Gene A. Church
Attorney, Agent, or Firm—Christie, Parker & Hale

[57] ABSTRACT

A rock bit has a rotary cutter cone journaled on a fixed journal bearing shaft with the radial load being taken by a cylindrical journal bearing. The friction bearing portion of the fixed shaft has a groove extending around the periphery of the shaft. The groove is filled with a bearing metal over an arc on the lower load bearing fraction of the shaft. The remaining unfilled portion of the groove is connected through a lubricant supply passage in the bit body with a pressure-compensated grease reservoir in the bit body, to supply lubrication to the journal bearing.

26 Claims, 3 Drawing Figures

ROCK BIT BEARING STRUCTURE

CROSS REFERENCE TO RELATED APPLICATIONS

This is a continuation of application Ser. No. 695,906, filed June 14, 1976, now abandoned.

BACKGROUND OF THE INVENTION

This invention relates to rotary rock bits, and more specifically to improved manufacturing and bearing structure for the rotary cutter cones of the drill bit.

Rotary type drilling bits, such as are used in drilling rock for oil, utilize cutters which are subject to very high vertical loads from the weight of the drill string. The bearings for rotatably supporting the cutters are subjected to severe loading conditions which may cause the drill bit to fail even before the cutters wear out. The friction type journal bearing is superior over anit-friction ball or roller type bearings for withstanding high radial loads, but friction type bearings require continuous lubrication to prevent excessive wear and premature failure. This has led to the development of rock bits which include a lubricant reservoir which is in communication with the bearing area between the rotary cutter cone and the journal bearing shaft. Such a lubrication system is described, for example, in U.S. Pat. No. 3,917,028 which shows a lubrication system utilizing a reservoir which is pressure-compensated. In such a system with a pressure compensating reservoir, a lubricant passage leads from the compensator to the surface of a journal bearing on the shaft. A flat is often cut on the upper, unloaded side of the journal bearing where the lubricant passage intersects it. Use of a pressure compensator permits the lubrication system to be completely sealed against drilling mud and other contaminating materials while permitting the lubrication system to adjust to changes in pressure due to expansion and volatilization of the lubricant in response to the elevated temperatures and pressures to which the lubricant is subjected during operation.

To further improve wear of the journal bearing, it has been the practice for several years to provide a bearing metal on the journal leg or shaft which extends around the lower third of the circumference of the shaft in the region of maximum load. During drilling this fraction of the bearing is loaded and the balance has only light, if any, loads. An arcuate slot was milled in the bearing surface of the lower third of the shaft and filled with hard bearing metal by weld deposition. The surface of the bearing metal was then ground to a radius about 0.002 inch larger than the journal bearing surface and with an axis of curvature about 0.002 inch lower than the axis of the journal. Thus, the lower part of the bearing surface on the journal is offset downwardly a small amount. This eccentricity minimizes excessive squeeze on the O-ring seal on the loaded lower side of the journal and does not require an eccentric O-ring groove for the same purpose. Milling of the arcuate slot for the bearing metal necessitates a separate machining operation and does add to the cost of manufacture.

In U.S. Pat. No. 3,746,405 there is shown a rock bit in which an arcuate slot is milled in the upper unloaded half of the journal shaft, the lower half being case hardened. The space formed by the slot and surrounding sleeve is used to store a small quantity of lubricating grease. However, this arrangement requires a separate milling operation to form a slot around only a part of the periphery of the shaft. Further, the quantity of grease that can be stored is very limited and is not compensated for the effects of large pressure and temperature variations.

SUMMARY OF THE INVENTION

The present invention is directed to an improved rock bit construction and method of manufacture in which the rotary cutters are supported by journal bearings utilizing pressure compensated lubricant reservoirs. In brief, the journal bearing has a shallow groove in the bearing surface which extends around the full circumference of the journal shaft. Thus, the groove can be formed at the same time the journal shaft is being turned on a lathe. Bearing metal is applied in the groove over the lower load bearing third of the circumference, leaving the groove open over the remaining two-thirds of the circumference. Lubricant from a pressure compensating lubricant reservoir in the rock bit body is connected through a passage which opens into the unfilled portion of the groove, the lubricant passing through the groove directly to the maximum load bearing arc of the journal in the region of the bearing metal.

DESCRIPTION OF THE DRAWINGS

For a more complete understanding of the invention reference should be made to the accompanying drawings, wherein.

DETAILED DESCRIPTION

Figure 1:
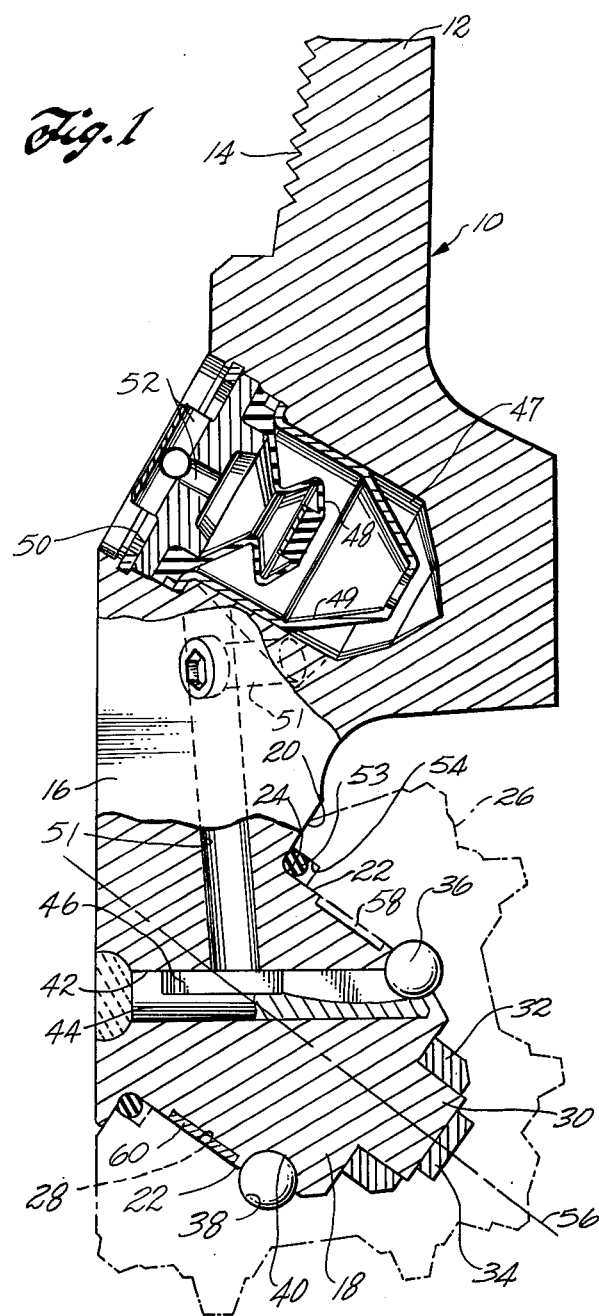
FIG. 1 is a longitudinal vertical sectional view through a portion of a drill bit body.
Figure 2:
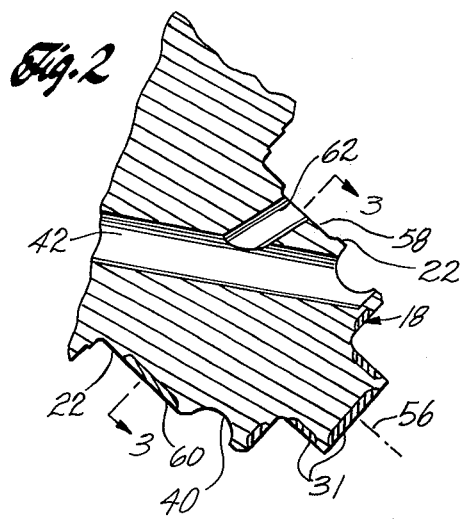
FIG. 2 is a partial sectional view of a drill bit body showing the journal leg with the lubrication passages.
Figure 3:
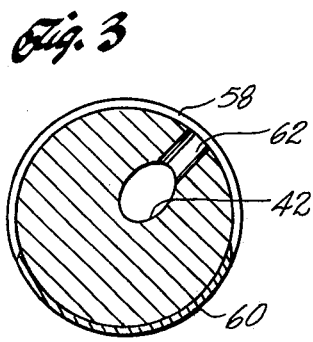
FIG. 3 is a cross-sectional view of the bearing journal taken substantially on the line 3—3 of FIG. 2.

Referring to the drawings in detail, the numeral 10 indicates one steel leg of a rock bit body. Normally three such legs are arranged around the vertical axis and welded together to form a circular drill bit. The drill bit body includes an upper shank portion 12 having drill bit attachment threads 14. The outer surface 16 of the rock bit body is generally cylindrical in shape and subtends 120° of arc. Thus when the three legs are joined they form a complete cylindrical outer surface for the drill bit body. The lower end of the leg 10 is formed with an inwardly projecting spindle shaft or bearing journal, indicated at 18. The axis of the spindle shaft 18 extends downwardly and inwardly towards the vertical axis of revolution of the rock bit. The drill bit body adjacent the inner end of the spindle shaft 18 is machined with a flat surface 20 which joins a generally cylindrical bearing portion 22 of the spindle shaft by a radius 24.

A conventional rotary cutter 26 of generally conical shape has a cylindrical bore 28 which forms a friction bearing by which the cutter is journaled on the spindle shaft 18. The cutter can either have integral teeth or carbide inserts as are conventional in the rock bit art. Conventionally the lower end of the shaft 18 has a reduced diameter friction pin 30. A hard metal friction bushing 32 is mounted in the rotary cutter core 26 while a thrust button 34 is positioned at the end of the bore in the cutter cone and engages the end of the friction pin 30. The bearing journal is hardened steel and often includes hard facing bearing surfaces 31.

To hold the cutter 26 on the shaft 18, ball bearings 36 are provided which roll in complementary race portions 38 and 40 in the center bore of the cutter and in the shaft 18, respectively. The balls are inserted in the race after the cutter is positioned on the shaft 18 by inserting the balls through a passage 42 connecting the race with the outside surface 16 of the drill bit body. After the balls are inserted through the passage 42, a retainer plug 44 is inserted and welded in the passage to retain the balls in the race. The ball retainer plug 44 is provided with a groove 46 through which a lubricant is supplied to the ball bearings, as hereinafter described.

Lubrication is provided by a lubricant, such as grease, stored in a pressure compensated reservoir in a cavity 47 in the rock bit body. A rubber "boot" 48 in the general form of a bellows is captive between a metal cup 49 in the cavity and a plug 50. The interior of the cup 49 and cavity 47 are filled with grease for the bearings of the rock bit. The grease communicates with the bearings by way of a passage 51 through the rock bit body to the lubricant groove 46 in the ball retainer plug 44. The exterior of the rubber boot communicates with drilling fluid in the well bore during use of the rock bit by way of passages 52 in the reservoir plug 50.

Loss of lubricant, as well as admission of drilling fluid and other foreign material into the bearings, is prevented by an O-ring 53 which engages the radius 24 at the base of the shaft 18 and engages a groove 54 formed at the outer end of the bore 28 in the cutter 26. The O-ring 53 provides a rotary pressure seal between the bearing region of the cutter and shaft and the exterior of the drilling bit.

Pressure changes between the grease inside the reservoir and bearings and drilling fluid outside the rock bit occur as the bit is operated in changing environments of temperature, load and external pressure. Changes occur in the effective volume of the grease which could cause either loss of grease from the system or intrusion of foreign matter into the bearings despite the O-ring 53 if it were not for the pressure reservoir. Such volume changes are accommodated by the flexible rubber boot 48 which can move inwardly or outwardly as required and still maintain a sealed system without undue loading on the O-ring 53.

As thus far described, the rock bit is of substantially known design such as described in the above-identified U.S. Pat. No. 3,917,028. The present invention includes an improved combined friction-type journal bearing and lubrication therefor. When the shaft or pin 18 is machined by turning it on a lathe about the axis 56, a shallow groove 58 (60 to 65 mils deep) is formed around the periphery of the cylindrical portion 22 of the shaft 18. The axial extent of the groove is slightly less than the axial length of the cylindrical portion, thereby leaving a narrow bearing shoulder at each side of the groove. The lower part of the groove 58 (less than about half the circumferential length of the groove) is then filled with a bearing material 60 such as a type 4 hard facing composition as set forth in the *Metals Handbook*, Vol. 6, page 153. Preferably the hard facing alloy is a nickel or cobalt base alloy having a higher hardness than the hardened steel of the balance of the cylindrical bearing surface 22. Other materials suitable for rock bit journal bearings can also be used such as aluminum bronze. The bearing metal may be applied by arc welding, flame welding, or other conventional technique. Excess bearing metal on the outer surface of the journal bearing shaft is then ground or otherwise machined off almost flush with the cylindrical portion 22 of the shaft to have a slight eccentricity as hereinabove described, allowing the cutter to be journaled on the shaft without undue squeeze on the O-ring 53 and leaving an unfilled lubricant distribution groove extending about two-thirds of the way around the top of the shaft. A lubrication passage 62 in the pin or shaft 18 connects the upper portion of the distribution groove 58 to the passage 42. Thus a portion of the lubricating grease from the reservoir 48 passes through the slot 46 in the ball retaining plug 44 and up the passage 62 into the groove 58 to lubricate the friction bearing. The bearing metal in the load bearing fraction of the journal bearing shaft is preferably chamfered at either end to form a beveled transition at the arcuate ends adjacent the remaining unfilled groove.

It has been found that by forming a groove which extends around the full circumference of the shaft and filling only the load bearing lower third of the groove with the bearing metal, enhanced lubrication of the interface between the hard facing material of the shaft and the cutter bore is provided. It is believed that previously insufficient lubricant was reaching the load bearing portion of the journal bearing. Prior grease reservoir techniques each failed to assure adequate lubrication under all operating conditions. It has been found that under similar conditions, bearing life of the rock bit has been extended by more than 5%, while at the same time the manufacturing costs have been reduced as compared with previous cutter bearing designs. Furthermore, the footage of hole drilled per bit is increased and greater rotational speeds can be used without premature bearing failure. A bearing is considered to fail prematurely when one bearing on a three cone rock bit fails while the other two are still in excellent condition or when the bearings fail far below the expected average run under the same conditions. Complaints of bit failure have decreased significantly with the new journal bearing.

The remaining bearing surface 22 on either side of the groove 58 on the unloaded side of the shaft 18 is sufficient to keep the cutter centered and to receive light loads on the unloaded side experienced, for example, when the drill is withdrawn from the bore. At the same time, grease is retained in the distribution groove and circulates to either end of the groove to lubricate the hard faced load bearing interface 60. The combination of the bearing metal on the load bearing fraction of the sealed friction bearing with the groove and connected sealed reservoir of grease assures an ample supply of grease at the load bearing interface. The pressure compensated reservoir in combination with the lubricant distribution groove permits lubrication to be maintained under the wide range of pressure and temperature conditions encountered in deep drilling operations and minimizes lubricant starvation at the load bearing interface. Forming a full circumferential groove and filling a part with bearing metal significantly reduces manufacturing costs.

What is claimed is:

1. A rock bit comprising a drill bit body having a journal bearing spindle shaft, a rotary cutter cone rotatably supported on the shaft, the shaft having a cylindrical bearing portion, the cutter cone having a cylindrical bore extending around the bearing portion for forming a friction bearing, the bearing portion of the shaft having a shallow groove extending around the periphery thereof, bearing metal applied in the groove over less than about half the circumference of the groove, the bearing metal forming a surface flush with said cylindrical bearing portion, a pressure compensating grease reservoir in the bit body, and a passage connecting the grease reservoir to the groove.

2. A rock bit as recited in claim 1 wherein the bearing metal is chamfered at both ends.

3. A rock bit as recited in claim 1 wherein the axial width of the groove is less than the axial length of the bearing portion of the shaft.

4. A rock bit as recited in claim 1 wherein the bearing metal is a hard facing material having a higher hardness than the bearing portion of the shaft.

5. A rock bit comprising:
a bit body;
a journal bearing shaft on the bit body;
a rotary cutter cone rotatably supported on the journal bearing shaft and including a cylindrical bore extending around a portion of the journal bearing shaft for forming a friction bearing surface;
a cyclindrical bearing portion on the journal bearing shaft opposite the cylindrical bore, said cylindrical bearing portion including a pair of axially spaced apart cyclindrical bearing surfaces of hardened steel, a circumferential groove between the cylindrical bearing surfaces, and a bearing metal applied in the groove in only the lower load bearing fraction of the journal bearing shaft and flush with the cylindrical bearing surfaces;
a lubricant reservoir in the bit body;
means in the lubricant reservoir for compensating for pressure changes; and
a lubricant passage between the reservoir and the unfilled portion of the circumferential groove.

6. A rock bit as recited in claim 5 wherein the bearing metal comprises a hard facing alloy having a higher hardness than the adjacent hardened steel cylindrical bearing surfaces.

7. A method of making a friction type bearing for a rotary rock bit comprising the steps of: turning a journal bearing shaft, forming a cylindrical bearing surface on the shaft, forming a groove around the circumference of the bearing surface, filling only a portion of the groove with a bearing metal, and machining the bearing metal flush with the cylindrical surface.

8. The method of claim 7 wherein the bearing metal is filled in over less than about half the circumference of the groove.

9. The method of claim 7 wherein the bearing metal comprises a hard facing alloy having a higher hardness than the cylindrical bearing surface on the shaft welded into the groove.

10. The method of claim 7 wherein the groove is formed with a width less than the axial extent of said cylindrical bearing surface on the shaft, the cylindrical bearing surface extending on both sides of the groove.

11. The method of claim 7 further including the step of: forming a hole through the journal bearing shaft and opening into the unfilled portion of the groove to provide a passage for lubricant to the groove.

12. A method of making a rotary rock bit having a friction type bearing for a cutter cone comprising the steps of:
turning a journal bearing shaft including a pair of axially spaced apart cylindrical bearing surfaces and a circumferential groove therebetween;
filling a fraction of the circumference of the groove with bearing metal; and
removing excess bearing metal to form the outer surface thereof flush with the cylindrical bearing surfaces.

13. A method as recited in claim 12 wherein the filling step comprises welding a hard facing alloy having a higher hardness than the adjacent cylindrical bearing surfaces into the circumferential groove.

14. A rock bit comprising a drill bit body having a journal bearing spindle shaft, a rotary cutter cone rotatably supported on the shaft, the shaft having a cylindrical bearing portion, the cutter cone having a cylindrical bore extending around the bearing portion for forming a friction bearing, the bearing portion of the shaft having a shallow groove extending around the periphery thereof, bearing metal applied in the groove over less than about half the circumference of the groove and having a load bearing outer surface, a pressure compensating grease reservoir in the bit body, and a passage connecting the grease reservoir to the groove.

15. A rock bit as recited in claim 14 wherein the bearing metal is chamfered at both ends.

16. A rock bit as recited in claim 14 wherein the axial width of the groove is less than the axial length of the bearing portion of the shaft.

17. A rock bit as recited in claim 14 wherein the bearing metal is a hard facing material having a higher hardness than the bearing portion of the shaft.

18. A rock bit comprising:
a bit body;
a journal bearing shaft on the bit body;
a rotary cutter cone rotatably supported on the journal bearing shaft and including a cylindrical bore extending around a portion of the journal bearing shaft for forming a friction bearing surface;
a bearing portion on the journal bearing shaft opposite the cylindrical bore, said bearing portion including a pair of axially spaced apart cylindrical bearing surfaces of hardened steel, a circumferential groove between the cylindrical bearing surfaces, and a bearing metal applied in the groove in only the lower load bearing fraction of the journal bearing shaft and having a load bearing outer surface;
a lubricant reservoir in the bit body;
means in the lubricant reservoir for compensating for pressure changes; and
a lubricant passage between the reservoir and the unfilled portion of the circumferential groove.

19. A rock bit as recited in claim 18 wherein the bearing metal comprises a hard facing alloy having a higher hardness than the adjacent hardened steel cylindrical bearing surfaces.

20. A method of making a friction type bearing for a rotary rock bit comprising the steps of: turning a journal bearing shaft, forming a cylindrical bearing surface on the shaft, forming a groove around the circumference of the bearing surface, filling only a portion of the groove with a bearing metal, and machining an outer load bearing surface on the bearing metal.

21. The method of claim 20 wherein the bearing metal is filled in over less than about half the circumference of the groove.

22. The method of claim 20 wherein the bearing metal comprises a hard facing alloy having a higher hardness than the cylindrical bearing surface on the shaft welded into the groove.

23. The method of claim 20 wherein the groove is formed with a width less than the axial extent of said cylindrical bearing surface on the shaft, the cylindrical bearing surface extending on both sides of the groove.

24. The method of claim 20 further including the step of: forming a hole through the journal bearing shaft and opening into the unfilled portion of the groove to provide a passage for lubricant to the groove.

25. A method of making a rotary rock bit having a friction type bearing for a cutter cone comprising the steps of:

turning a journal bearing shaft including a pair of axially spaced apart cylindrical bearing surfaces and a circumferential groove therebetween;

filling a fraction of the circumference of the groove with bearing metal; and removing excess bearing metal to form a load bearing surface on the outer surface thereof.

26. A method as recited in claim 25 wherein the filling step comprises welding a hard facing alloy having a higher hardness than the adjacent cylindrical bearing surfaces into the circumferential groove.

* * * * *